(12) United States Patent
Son

(10) Patent No.: US 6,328,376 B2
(45) Date of Patent: Dec. 11, 2001

(54) CENTER PILLAR ASSEMBLY OF MOTOR VEHICLE

(75) Inventor: Baik-Lark Son, Kyonggi-do (KR)

(73) Assignee: Kia Motors Corporation, Kwangmyong-shi (KR)

( * ) Notice: Subject to any disclaimer, the term of this patent is extended or adjusted under 35 U.S.C. 154(b) by 0 days.

(21) Appl. No.: 09/740,759

(22) Filed: Dec. 13, 2000

(51) Int. Cl.$^7$ .................................................. B62D 25/00
(52) U.S. Cl. .................... 296/203.03; 296/189; 296/210; 296/30
(58) Field of Search ................. 296/203.03, 203.01, 296/210, 29, 30, 188, 189

(56) References Cited

U.S. PATENT DOCUMENTS

| | | |
|---|---|---|
| 4,682,812 | 7/1987 | Hurten et al. . |
| 4,950,024 | 8/1990 | Watari et al. . |
| 5,246,264 | 9/1993 | Yoshii . |
| 5,873,618 | 2/1999 | Ejima . |
| 5,984,402 | 11/1999 | Takeuchi . |
| 6,027,160 * | 2/2000 | Brodt ................................. 296/210 |
| 6,073,992 * | 6/2000 | Yamuchi et al. ............... 296/203.01 |
| 6,086,141 | 7/2000 | Masuda et al. . |

FOREIGN PATENT DOCUMENTS 6-239267 * 8/1994 (JP) ................................. 296/203.03

* cited by examiner

*Primary Examiner*—Joseph D. Pape
*Assistant Examiner*—Patricia Engle
(74) *Attorney, Agent, or Firm*—Birch, Stewart, Kolasch & Birch, LLP

(57) ABSTRACT

Disclosed is a center pillar assembly of a motor vehicle. The center pillar assembly comprises an outer panel extending from a lower surface of a flange portion of a roof panel toward a floor, the outer panel having an upper end portion which projects outward and upward to form a portion of a side frame arranged along a side of the roof panel; a reinforcing panel extending from a lower surface of an upper flange portion of the outer panel toward the floor such that the reinforcing panel is separated from the outer panel, the reinforcing panel having a stepped portion which is bent toward the upper end portion of the outer panel to define a step-shaped configuration; an inner panel extending from a surface of a roof rail member which is opposed to an upper portion of the side frame, toward the floor, the inner panel cooperating with the outer panel to define a closed space therebetween, the roof rail member having a flange portion on which the roof rail member is joined to an upper end of the side frame; and an upper reinforcing member extending from the upper flange portion of the reinforcing panel along an inner surface of the reinforcing panel, the upper reinforcing member cooperating with the stepped portion of the reinforcing panel to form a closed cross-section.

1 Claim, 3 Drawing Sheets

CENTER PILLAR ASSEMBLY OF MOTOR VEHICLE

BACKGROUND OF THE INVENTION

1. Field of the Invention

The present invention relates to a center pillar assembly of a motor vehicle, which is arranged between a front door and a rear door in such a way as to connect a roof and a floor with each other.

2. Description of the Related Art

In a conventional motor vehicle as shown in FIG. 1, a plurality of pillar assemblies 1 which are located on a left side and a right side of a vehicle body along a lengthwise direction of the body, function to support a roof 2 at a predetermined height from a floor and to hold front and rear doors 3 and 4 each of which is installed between two pillar assemblies 1.

Referring to FIG. 2, among the plurality of pillar assemblies 1, an example of a center pillar assembly which connects the roof 2 and the floor with each other between the front and rear doors 3 and 4, is illustrated.

As can be readily seen from FIG. 2, the center pillar assembly includes outer and inner panels 12 and 16 which are joined with each other in such a way as to delimit a closed space therebetween and connect the roof 2 and the floor with each other, and a reinforcing panel 14 which is disposed in the closed space defined between the outer and inner panels 12 and 16 in such a way as to reinforce rigidity of the center pillar assembly.

The outer panel 12 has an upper end portion 13 and a lower end portion which are integrated with a side frame of the vehicle body. The upper end portion 13 of the outer panel 12 is formed in a manner such that it projects outward and upward to correspond to a contour of an upper portion of the side frame. A flange portion which is formed on an upper end of the outer panel 12, is joined to a flange portion of a roof panel 32, which flange portion is formed on a side end of the roof panel 32.

The inner panel 16 is joined, below the roof panel 32, to a surface of a roof rail member 36 which is opposed to the upper portion of the side frame to delimit the closed space, and extends downward toward the floor. The inner panel 16 cooperates with the outer panel 12 to define the closed space.

As described above, the reinforcing panel 14 is disposed in the closed space which is delimited by the outer and inner panels 12 and 16, so as to reinforce rigidity of the center pillar assembly against external force.

Also, an anchor nut plate 19 for fastening a seat belt anchor nut is placed between the reinforcing panel 14 and the inner panel 16, adjacent to an upper end of the center pillar assembly.

In the center pillar assembly constructed as mentioned above, external force which is applied to the center pillar assembly upon side impact or the like, is absorbed by the reinforcing panel 14 which is disposed in the closed space defined between the outer and inner panels 12 and 16.

In this regard, because a head portion of an occupant is apt to be severely damaged upon impact in comparison with other portions of the human body and is very difficult to be restored to health, an upper part of a center pillar assembly must have excellent rigidity not to be deformed by side impact and thereby not to cause damage to the head portion of the occupant. In view of this consideration, the reinforcing panel 14 is formed, at an upper end thereof, with a stepped portion 15 which is bent toward the upper end portion 13 of the outer panel 12 in a manner such that rigidity of the upper part of the center pillar assembly is further reinforced.

However, in practice, even though the stepped portion 15 is formed on the upper end of the reinforcing panel 14, rigidity of the upper part of the center pillar assembly cannot be sufficiently increased in a manner such that the upper part of the center pillar assembly is not deformed due to side impact not to cause damage to the head portion of the occupant.

SUMMARY OF THE INVENTION

Accordingly, the present invention has been made in an effort to solve the problems occurring in the related art, and an object of the present invention is to provide a center pillar assembly of a motor vehicle, which is reinforced in rigidity of its upper part so that the upper part is prevented from being deformed in such a way as not to cause damage to a head portion of an occupant.

In order to achieve the above object, according to one aspect of the present invention, there is provided a center pillar assembly arranged between a front door and a rear door of a motor vehicle, for connecting a roof and a floor with each other, the center pillar assembly comprising: an outer panel extending from a lower surface of a flange portion of a roof panel toward the floor, the outer panel having an upper end portion which projects outward and upward to form a portion of a side frame arranged along a side of the roof panel; a reinforcing panel extending from a lower surface of an upper flange portion of the outer panel toward the floor in a manner such that the reinforcing panel is separated from the outer panel, the reinforcing panel having a stepped portion which is bent toward the upper end portion of the outer panel in such a way as to define a step-shaped configuration; an inner panel extending from a surface of a roof rail member which is opposed to an upper portion of the side frame, toward the floor, the inner panel cooperating with the outer panel to define a closed space therebetween, the roof rail member having a flange portion on which the roof rail member is joined to an upper end of the side frame; and an upper reinforcing member extending from the upper flange portion of the reinforcing panel along an inner surface of the reinforcing panel, the upper reinforcing member cooperating with the stepped portion of the reinforcing panel to form a closed cross-section.

By the feature of the present invention, rigidity of an upper part of the center pillar assembly is remarkably reinforced by the presence of the upper reinforcing member which cooperates with the stepped portion of the reinforcing panel to form the closed cross-section.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
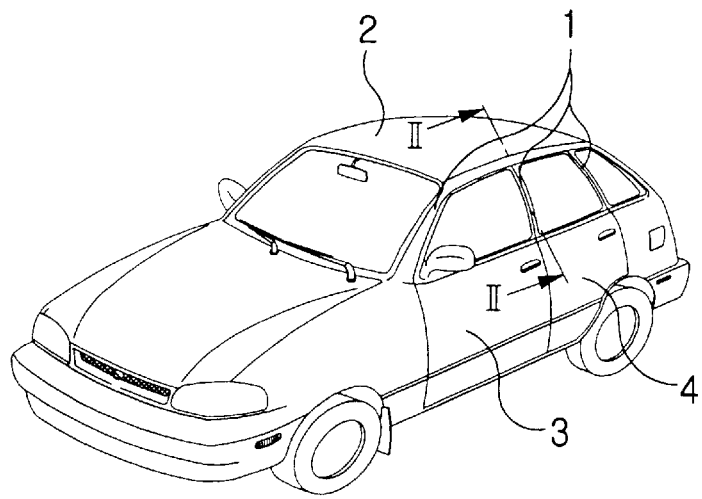
FIG. 1 is a perspective view illustrating an outer appearance of a motor vehicle.
Figure 2:
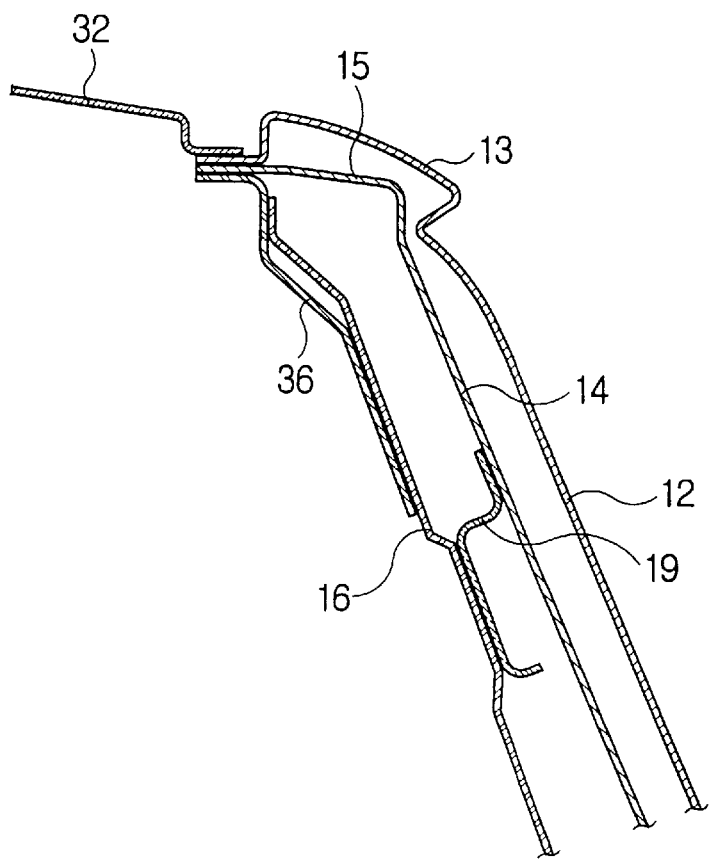
FIG. 2 is a cross-sectional view taken along the line II—II of FIG. 1, illustrating an upper part of a conventional center pillar assembly.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
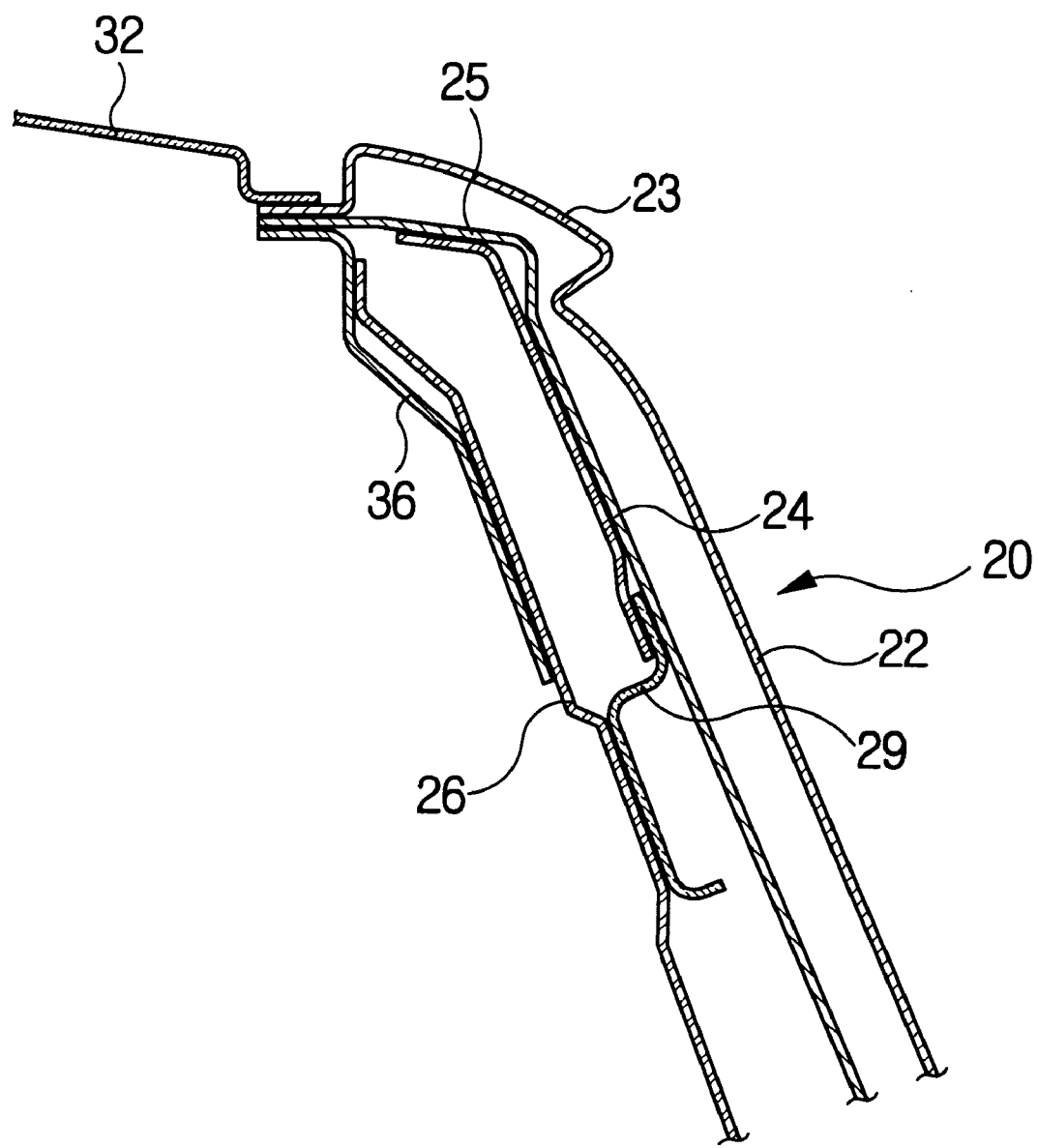
FIG. 3 is a cross-sectional view illustrating an upper part of a center pillar assembly of a motor vehicle, in accordance with an embodiment of the present invention.
Figure 4:
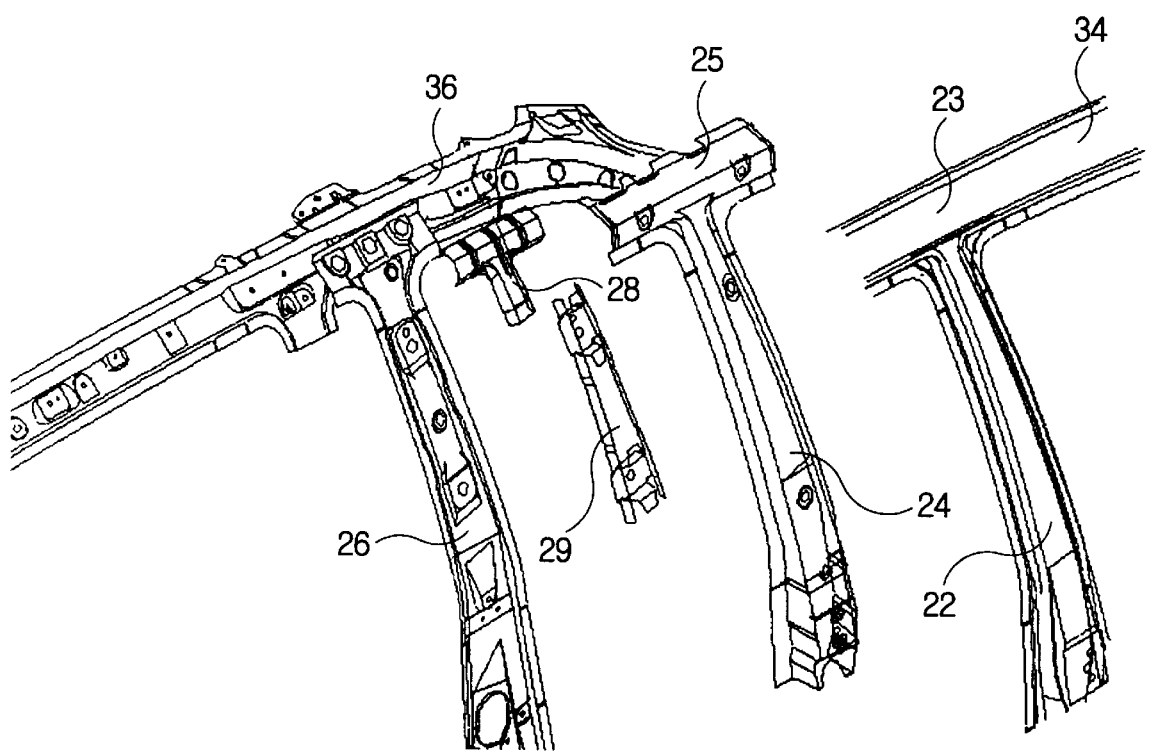
FIG. 4 is an exploded perspective view for the upper part of the center pillar assembly according to the present invention.

FIG. 3 is a cross-sectional view illustrating an upper part of a center pillar assembly of a motor vehicle, in accordance with an embodiment of the present invention; and FIG. 4 is an exploded perspective view for the upper part of the center pillar assembly according to the present invention.

As shown in FIGS. 3 and 4, a center pillar assembly 20 in accordance with an embodiment of the present invention includes outer and inner panels 22 and 26, a reinforcing panel 24, and an upper reinforcing member 28.

The outer and inner panels 22 and 26 are joined with each other to define a closed space therebetween, and function to connect a roof and a floor of a vehicle body with each other.

The outer panel 22 has an upper flange portion which is joined to a lower surface of a flange portion of a roof panel 32. The outer panel 22 extends downward toward the floor. The outer panel 22 is integrated with a side frame 34 in a manner such that upper and lower portions of the outer panel 22 form portions of the side frame 34, respectively. An upper end portion 23 of the outer panel 22, which partially forms an upper portion of the side frame 34, is formed in a manner such that the upper end portion 23 projects outward and upward to correspond to a contour of the upper portion of the side frame 34.

A roof rail member 36 which cooperates with the upper portion of the side frame 34 to delimit a closed space, is disposed below the roof panel 32. The inner panel 26 extends from a surface of the roof rail member 36 toward the floor. As described above, the inner panel 26 cooperates with the outer panel 22 to delimit the closed space.

The reinforcing panel 24 is provided in the closed space which is defined by the outer and inner panels 22 and 26, and has an upper flange portion which is interposed between the upper flange portion of the outer panel 22 and an upper flange portion of the roof rail member 36. The reinforcing panel 24 has, at its upper end, a stepped portion 25 which is bent toward the upper end portion 23 of the outer panel 22 to define a step-shaped configuration. Each of the inner panel 26 and the reinforcing panel 24 defines substantially a T-shaped contour, in a state wherein their upper flange portions extend in a lengthwise direction of the vehicle body, whereby a joining strength at a joined region is elevated.

Also, an anchor nut plate 29 for fastening a seat belt anchor nut is placed between the reinforcing panel 24 and the inner panel 26, adjacent to an upper end of the center pillar assembly.

The upper reinforcing member 28 extends from a lower surface of the upper flange portion of the reinforcing panel 24 to the anchor nut plate 29 which is secured to the reinforcing panel 24, along the reinforcing panel 24. The upper reinforcing member 28 cooperates with the stepped portion 25 of the reinforcing panel 24 to delimit the closed space. The upper reinforcing member 28 has substantially a T-shaped contour as in the case of the inner panel 26 and the reinforcing panel 24, in a state wherein the upper flange portion of the upper reinforcing member 28 extends in the lengthwise direction of the vehicle body, whereby a joining strength at an upper end thereof is elevated.

As can be readily seen from above descriptions, the center pillar assembly 20 according to the present invention, constructed as mentioned above, further includes the upper reinforcing member 28 which cooperates with the stepped portion 25 of the reinforcing panel 24 in such a way as to delimit the closed space. According to this, rigidity of the upper part of the center pillar assembly 20 is remarkably reinforced, so that the upper part is prevented from being deformed, in such a way as not to cause damage to a head portion of an occupant.

In the drawings and specification, there have been disclosed typical preferred embodiments of the invention and, although specific terms are employed, they are used in a generic and descriptive sense only and not for purposes of limitation, the scope of the invention being set forth in the following claim.

What is claimed is:

1. A center pillar assembly arranged between a front door and a rear door of a motor vehicle, for connecting a roof and a floor with each other, the center pillar assembly comprising:

an outer panel extending from a lower surface of a flange portion of a roof panel toward the floor, the outer panel having an upper end portion which projects outward and upward to form a portion of a side frame arranged along a side of the roof panel;

a reinforcing panel extending from a lower surface of an upper flange portion of the outer panel toward the floor in a manner such that the reinforcing panel is separated from the outer panel, the reinforcing panel having a stepped portion which is bent toward the upper end portion of the outer panel in such a way as to define a step-shaped configuration;

an inner panel extending from a surface of a roof rail member which is opposed to an upper portion of the side frame, toward the floor, the inner panel cooperating with the outer panel to define a closed space therebetween, the roof rail member having a flange portion on which the roof rail member is joined to an upper end of the side frame; and an upper reinforcing member extending from the upper flange portion of the reinforcing panel along an inner surface of the reinforcing panel, the upper reinforcing member cooperating with the stepped portion of the reinforcing panel to form a closed cross-section.

* * * * *

UNITED STATES PATENT AND TRADEMARK OFFICE
CERTIFICATE OF CORRECTION

PATENT NO. : 6,328,376 B2
DATED : December 11, 2001
INVENTOR(S) : Baik-Lark Son

It is certified that error appears in the above-identified patent and that said Letters Patent is hereby corrected as shown below:

<u>Title page,</u>
Please insert Item [30] Foreign Application Priority Data as follows:

-- [30]     Foreign Application Priority Data

Dec. 13, 1999   (KR)   Korea......................1999-57290
Nov. 22, 2000   (KR)   Korea......................2000-69451 --.

Signed and Sealed this

First Day of April, 2003

JAMES E. ROGAN
*Director of the United States Patent and Trademark Office*